United States Patent

Squirrell et al.

[11] Patent Number: 5,120,021
[45] Date of Patent: Jun. 9, 1992

[54] ISOLATORS

[75] Inventors: Anton F. Squirrell, Turnweg, Switzerland; Trevor H. Hearnden, Old Buckenham, United Kingdom

[73] Assignee: Grovag Grossventiltechnik AG, Baar, Switzerland

[21] Appl. No.: 655,398

[22] PCT Filed: Jun. 15, 1990

[86] PCT No.: PCT/GB90/00922
§ 371 Date: Mar. 26, 1991
§ 102(e) Date: Mar. 26, 1991

[87] PCT Pub. No.: WO90/15945
PCT Pub. Date: Dec. 27, 1990

[30] Foreign Application Priority Data

Jun. 15, 1989 [GB] United Kingdom ............... 8913735

[51] Int. Cl.⁵ .............................................. F16K 1/20
[52] U.S. Cl. .................................... 251/298; 251/356; 137/625.44; 137/875
[58] Field of Search ................. 137/625.44, 601, 875; 251/298, 299, 356

[56] References Cited

U.S. PATENT DOCUMENTS

| 3,035,810 | 5/1962 | Lowe et al. | 251/298 |
| 3,592,221 | 7/1971 | Worley et al. | 137/625.44 X |
| 3,698,429 | 10/1972 | Lowe et al. | 137/601 |
| 4,207,864 | 6/1980 | Fischer et al. | 137/601 X |
| 4,294,283 | 10/1981 | Scharres | 137/601 |
| 4,531,361 | 9/1982 | Worley | 137/625.44 |
| 4,552,181 | 11/1985 | Hawkins | 251/298 X |
| 4,821,507 | 4/1989 | Bachmann et al. | 137/875 X |
| 4,821,771 | 4/1989 | Maxwell | 137/625.44 |

Primary Examiner—John Rivell
Attorney, Agent, or Firm—Gottlieb, Rackman & Reisman

[57] ABSTRACT

An isolator including a combined blade and flap arm assembly in which two opposed side members (22) of a blade frame (31) are extended (22a) to attach to an operating shaft (21) to act as the load-bearing members of the system, the frame being completed by two opposed side members (23) oriented parallel to the shaft. Preferably insulation (37) is provided on one side only of a blade plate (33) attached in a flexible manner to a cross-sectionally generally channel-shaped blade frame by being either welded or bolted to at least one strip (34 or 34a, 34b, or 41, 42) welded to the frame. The blade designed in accordance with the present invention will accept differential expansion due to operational conditions while retaining the lightest possible construction.

7 Claims, 6 Drawing Sheets

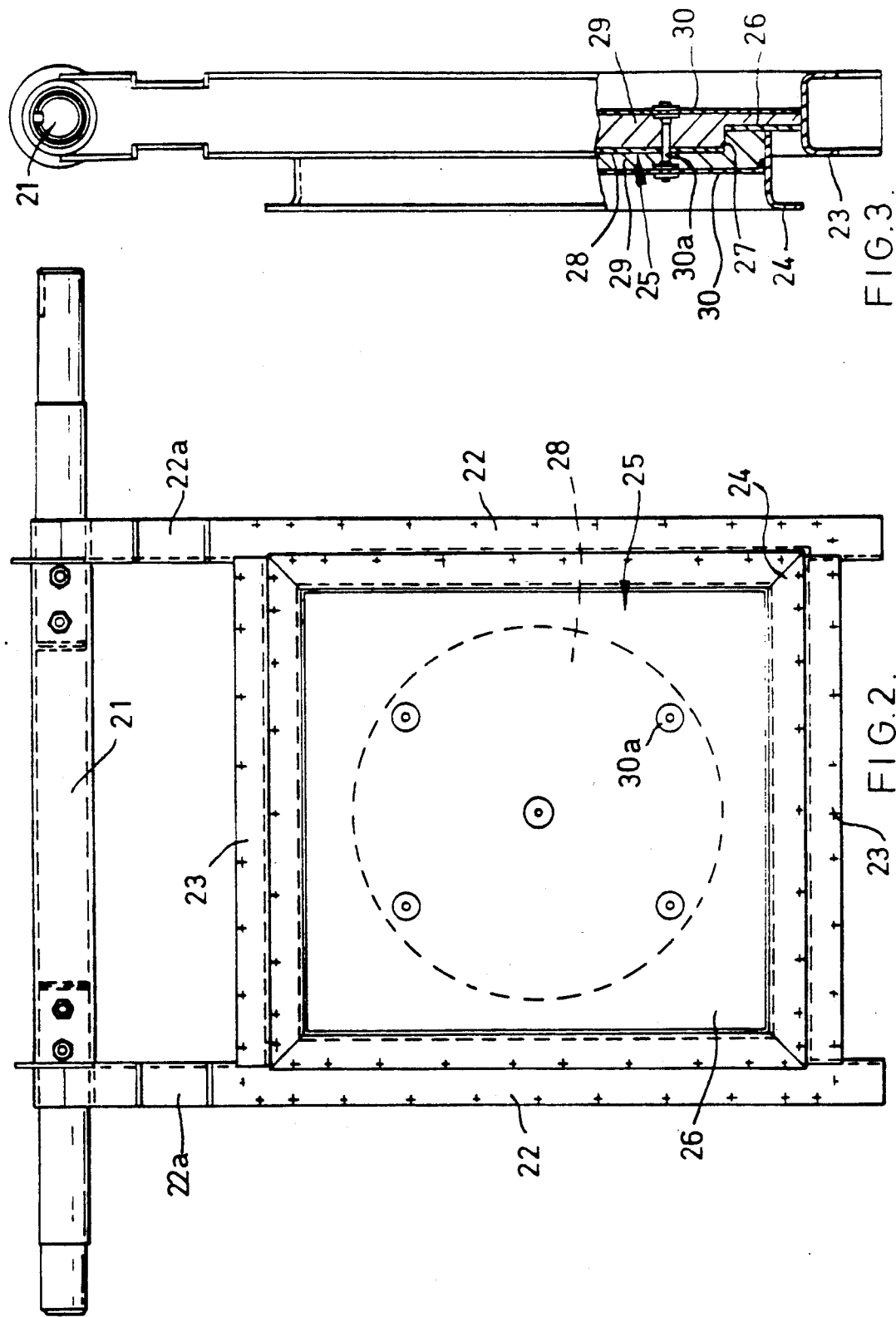

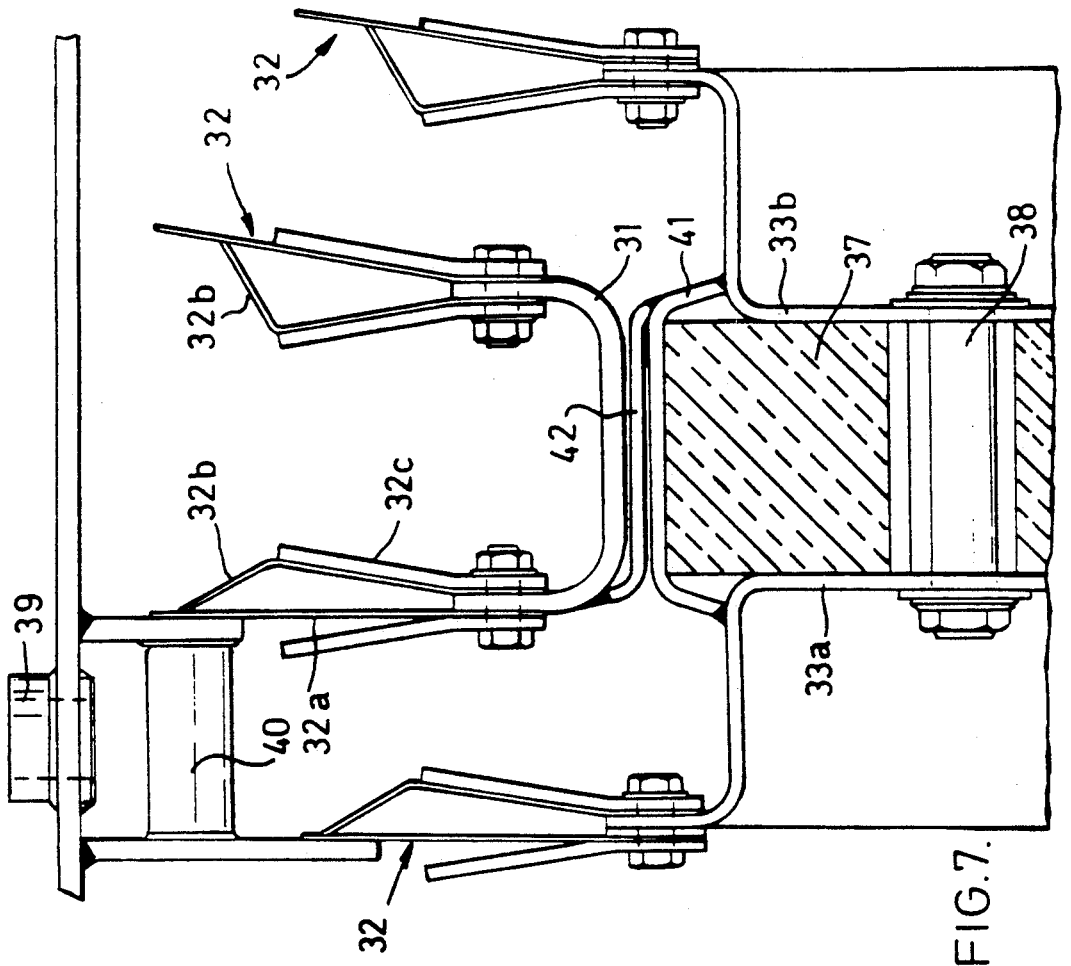
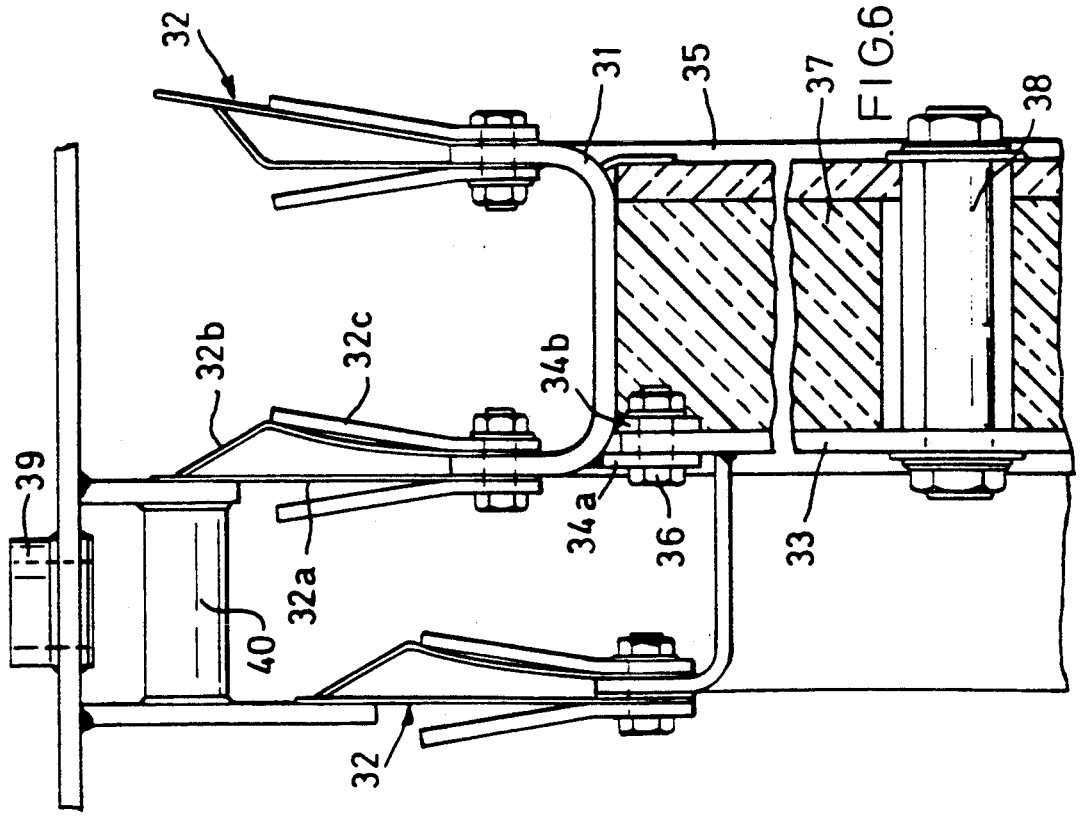
FIG.6.
FIG.7.

ISOLATORS

This invention relates to improvements in or relating to isolators, i.e. isolating valves, especially diverter and flap isolators. The invention is particularly concerned with the flap and blade construction of small such isolators.

Diverter and flap isolators are commonly used for gas turbine/waste heat recovery systems and other applications where high temperatures are involved. The isolators are fitted with thermal insulation to minimise the radiative and convective heat losses to the isolated space. The fitting of thermal insulation can cause, however, uneven temperature distributions throughout the blade structure which can lead to distortions and thus impair the sealing efficiency.

For large isolators this problem can be overcome by having a separate load bearing flap arm system to which separate blades are attached, one in the case of flap isolators, and two in the case of diverter isolators. As will be described in more detail subsequently with reference to the diverter isolator shown in FIG. 1 of the drawings, the attachment of the blade(s) to the flap arm assembly is carried out in such a way that differential movements are possible between the blade and flap arm assembly. For small flap and diverter isolators (typically up to 2m square) this solution is unnecessary as the differential movements are small. Further, because of smaller size it is difficult to design such a system in a suitably compact manner.

The present invention aims to overcome or at least mitigate the disadvantages of the known isolator systems.

The present invention provides an isolator wherein blade frame members thereof are used as load bearing members for transmitting the blade loading to an operating shaft.

There is suitably used a combined blade and flap arm assembly in which the side members of the blade frame are extended to attach to the shaft, acting as the load bearing members of the flap system. The edges of the blade frame are completed on the other two sides parallel to the shaft by two lateral channel members. Optionally an additional angle frame is welded to the blade plate to enable a double sealing system to be applied to one or both of the outlets. Flexible metallic seals are fitted to the periphery of these frames to provide the necessary closures.

Preferably insulation is provided on one side only of a blade plate, and the blade plate is attached to a cross-sectionally generally channel-shaped blade frame.

The blade plate is most preferably welded to the blade frame, either directly or through at least one strip.

Alternatively the blade frame may be provided with at least one flat strip around the inside boundary of the frame, the blade plate being bolted to the flat strip(s).

The insulation can be suitably retained between the blade plate and cladding, or alternatively the insulation can be retained between two blade plates.

A single or double seal is preferably provided at each side of the channel-shaped blade frame.

Where no insulation is required then the blade plate can be welded into the blade frame as no significant temperature differential exists between the blade frame and the blade plate.

In the case that insulation is required it is necessary to employ a different construction. Suitably the blade frame is provided with two flat strips around the inside of the frame, drilled to enable the blade plate to be bolted to it The outer strip is welded to the frame after bolting the blade in place. The holes in the blade plate are sufficiently large to take up the anticipated amount of differential expansion. The blade plate is attached to the blade frame using bolts, nuts, flat washers. On assembly the bolts are fully tightened, then slackened off a predetermined amount to ensure that the blade plate can differentially expand with respect to the blade frame, the nuts being finally tacked to the bolt to prevent slackening.

In this construction the insulation need only be on one side of the blade only, because the amount of differential expansion which can be accommodated is not limited by the maximum induced thermal stress, and it is therefore not necessary to minimise the temperature difference between the two components.

The main advantage of the blade design according to the invention is that it will accept differential expansions due to operational conditions while retaining the lightest possible construction.

In an alternative construction, particularly when the blade plate is welded to the blade frame, it may be desirable to apply insulation to both sides of a blade plate thereof in order to minimise or at least reduce the maximum temperature difference which can occur between the blade plate and the blade frame.

When the flap/blade is closed to isolate one outlet, the hot gases flowing past through to a second outlet cause the periphery of the blade frame to be at or close to the gas temperature. Due to the fact that the blade has insulation on both sides the metal temperature of the blade plate is at some intermediate temperature between the gas temperature and the temperature in the isolated space. This is true whichever outlet is closed, and it may not be possible to achieve this with insulation on one side only, particularly when the blade plate is welded to the blade frame; in one position the blade plate would be kept hot and in the other kept cold. Fitting insulation to both sides of the blade plate has the effect of reducing the maximum temperature difference between the blade frame and the blade plate, leading to a reduction in thermal stresses. However, evaluation of the strains due to even this reduced temperature difference shows that stresses close to or exceeding the yield point of the material will occur, indicating that this measure alone may be insufficient at high temperatures to ensure satisfactory service and compliance with the relevant design codes.

In these circumstances it is preferable that the blade plate has a dished construction, so as to better withstand thermally induced strains due to the temperature differences existing between the blade frame and the blade plate The provision of insulation on both sides of a blade plate is particularly used when the blade plate has a dished construction as described above.

Alternatively, insulation may be provided on one side of the blade plate only, with the blade plate being welded to the blade frame.

The invention will be further described, by way of example only, with reference to the accompanying drawings, in which:

FIG. 2 is a front view of the blade structure of an isolator according to the present invention, wherein blade frame members thereof are used as load bearing members, and wherein in this particular embodiment insulation is applied to both sides of a blade plate thereof and the blade plate has a dished construction;

FIG. 3 is a side view, partly in section, of the blade structure shown in FIG. 2;

Figure 5:
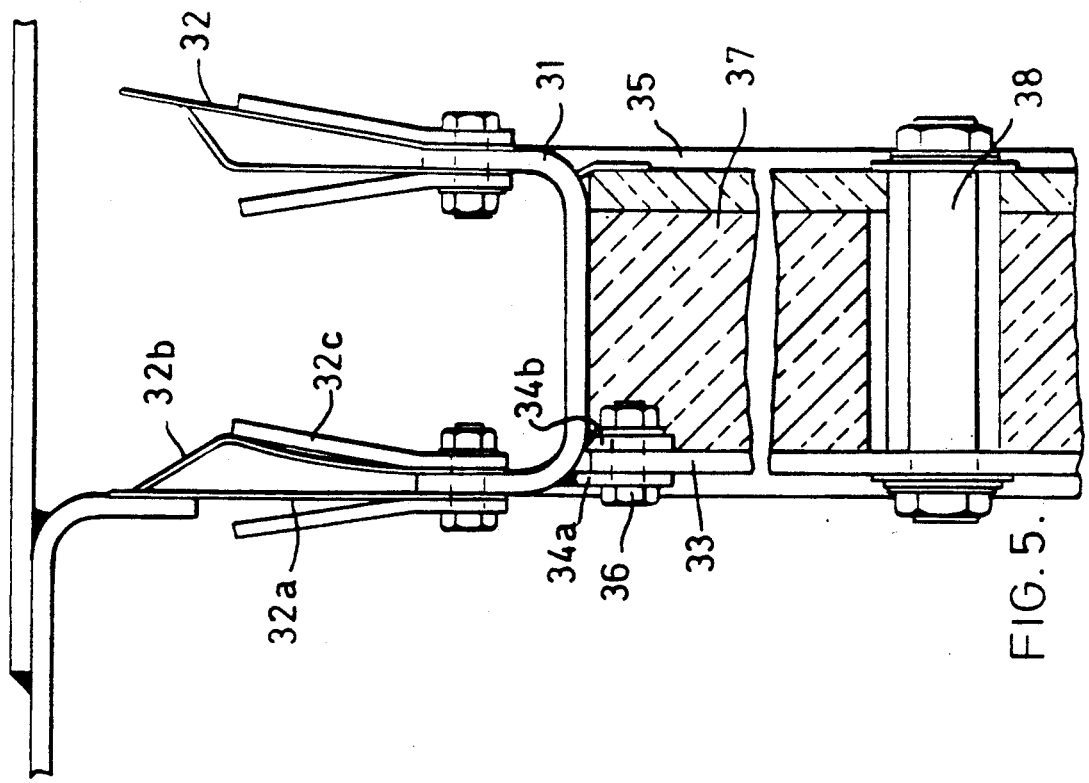
Figure 8:
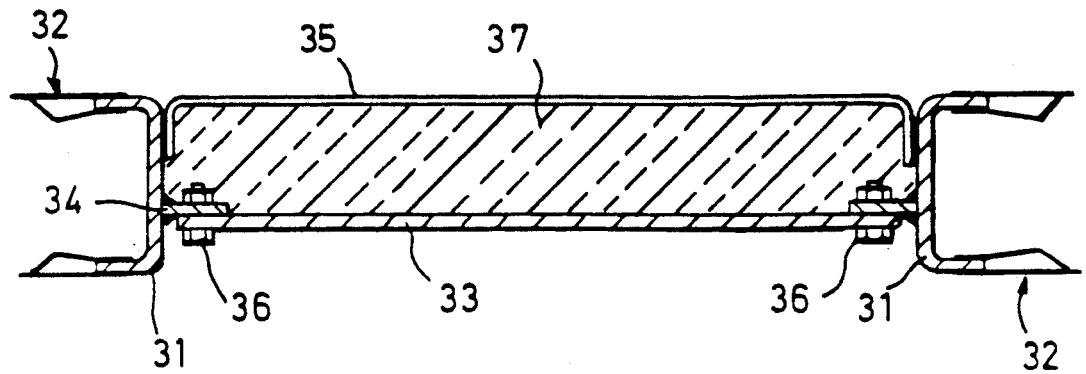
Figure 9:
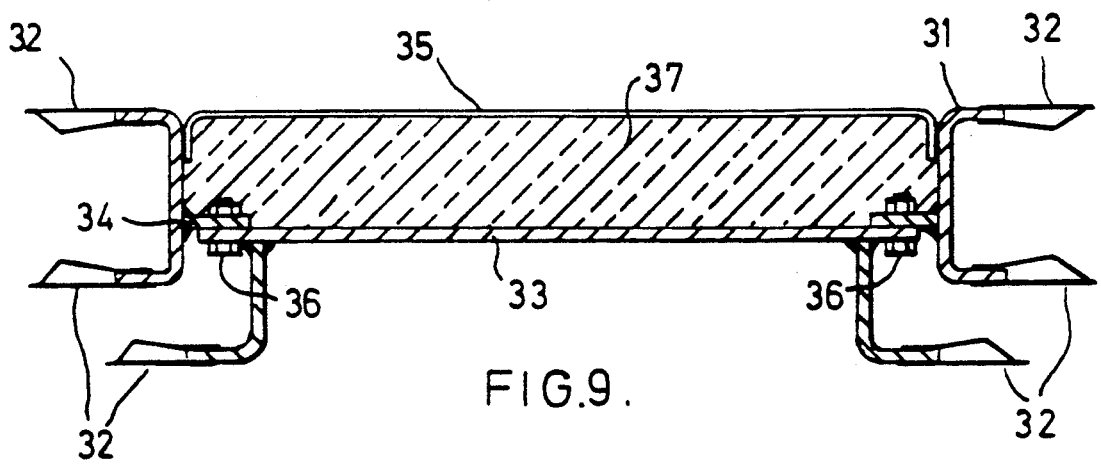
Figure 10A:
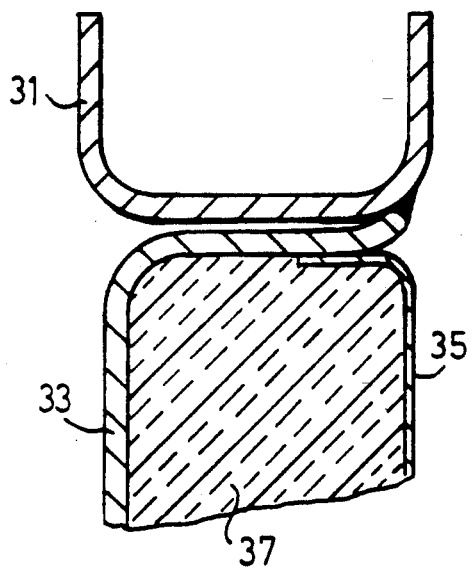
Figure 10B:
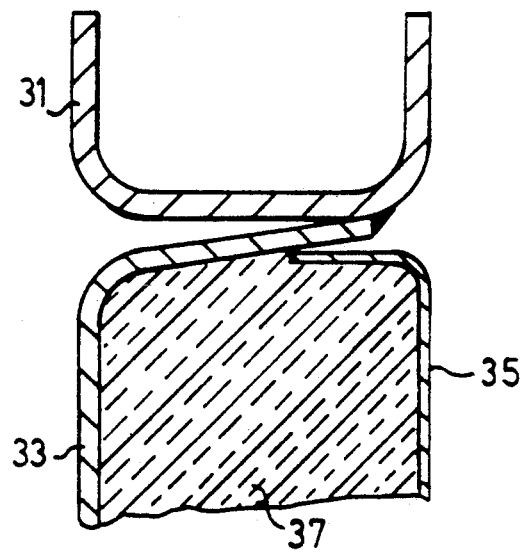
Figure 10C:
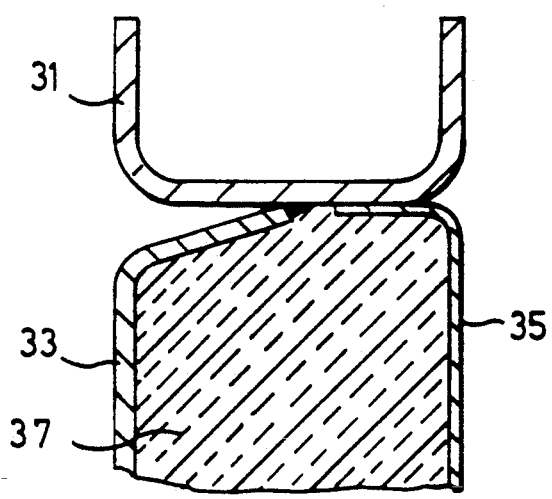

FIGS. 5, 6 and 7 are side views of a part of respective blade structures wherein insulated blades are employed, wherein FIG. 5 shows an arrangement wherein a single seal is provided at each side of the blade, FIG. 6 shows an arrangement wherein a single seal is provided at one side of the blade and a double seal is provided at the other side of the blade, and FIG. 7 shows an arrangement wherein double seals are provided at both sides of the blade;

FIGS. 8 and 9 show a simplified fixing system for the blade plate of the constructions shown in FIGS. 5 and 6 respectively; and FIGS. 10a, 10b and 10c are side views of a part of further respective blade structures according to the invention, wherein insulated blades are employed.

Figure 1:
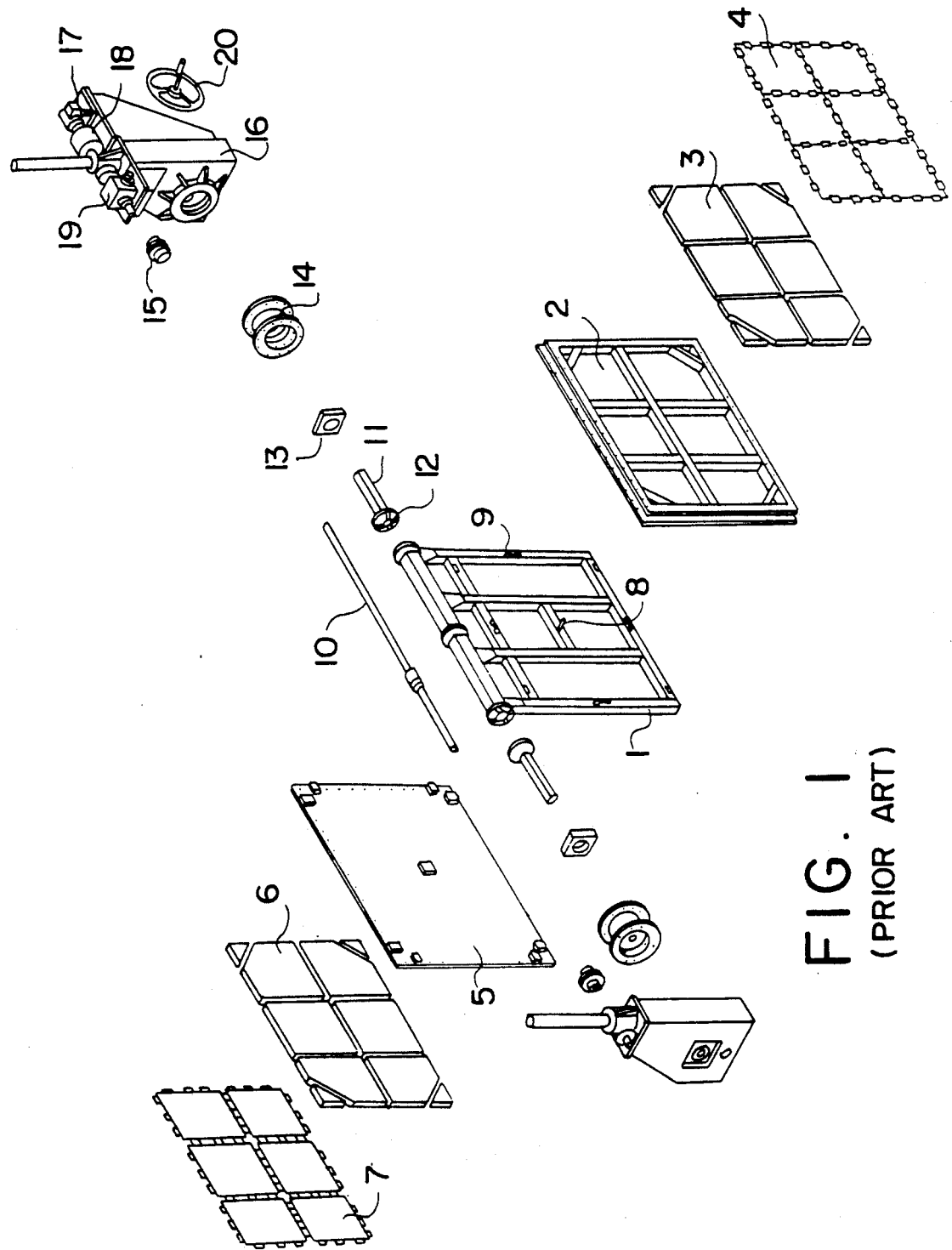
FIG. 1 is an exploded isometric view of a known type of blade structure of a diverter isolator.

The known blade structure shown in FIG. 1 has a separate load bearing flap arm system to which separate blades are attached.

Specifically, FIG. 1 shows a blade arm structure 1, to one side of which is attached a boiler inlet blade 2 to which is in turn attached an insulation 3 and an insulation cladding 4. To the other side of the blade arm structure 1 is attached a bypass blade 5 to which is in turn attached another insulation 6 and an insulation cladding 7. The blade arm structure 1 itself has a central fixing 8 for the blades and blade location guides 9.

The operating shaft comprises a connecting shaft 10 and, at each end thereof, a stub shaft 11 having a keyed and bolted flange connection 12, a shaft seal 13, a high temperature shaft bearing 14, a coupling 15, and an actuator 16. The actuator 16 has a motor 17, a reduction gear box 18 and bevel gearing 19. There is also a hand wheel 20. It may be noted that the drive motor assembly can be mounted centrally or inboard of actuators over duct as site conditions allow.

The blade structure shown in FIGS. 2 and 3 is a combined blade and flap arm assembly having an operating shaft 21, and in which side members 22 of the blade frame oriented transverse to the shaft 21 are extended at 22a to attach to the shaft 21, acting as the load bearing members of the flap system. The edges of the blade frame are completed on the other two sides parallel to the shaft by two lateral channel members 23. An additional angle frame 24 is welded to the blade plate (generally indicated by reference 25) to enable a double sealing system to be applied to one of the isolator outlets. Flexible metallic seals (not shown) are fitted to the periphery of these frames to provide the necessary closures.

The blade plate 25 itself is fabricated in the form of a square plate 26 having a large central circular hole. Around the hole is welded a thin circumferential strip 27 thus forming a short spigot. This spigot is closed by means of a disc 28 welded into the end of the spigot, the whole blade plate assembly forming a dished construction.

The blade plate 25 is fitted with insulation 29 on both sides thereof, together with insulation cladding 30. The insulation is retained in position by a series of studs 30a.

In the blade design described above, the blade frame members 22 are used as load bearing members transmitting the blade loading to the operating shaft 21.

Also, insulation 29 is applied to both sides of the blade plate 25 in order to minimise the maximum temperature difference which can occur between the blade frame and the blade plate.

Figure 4:
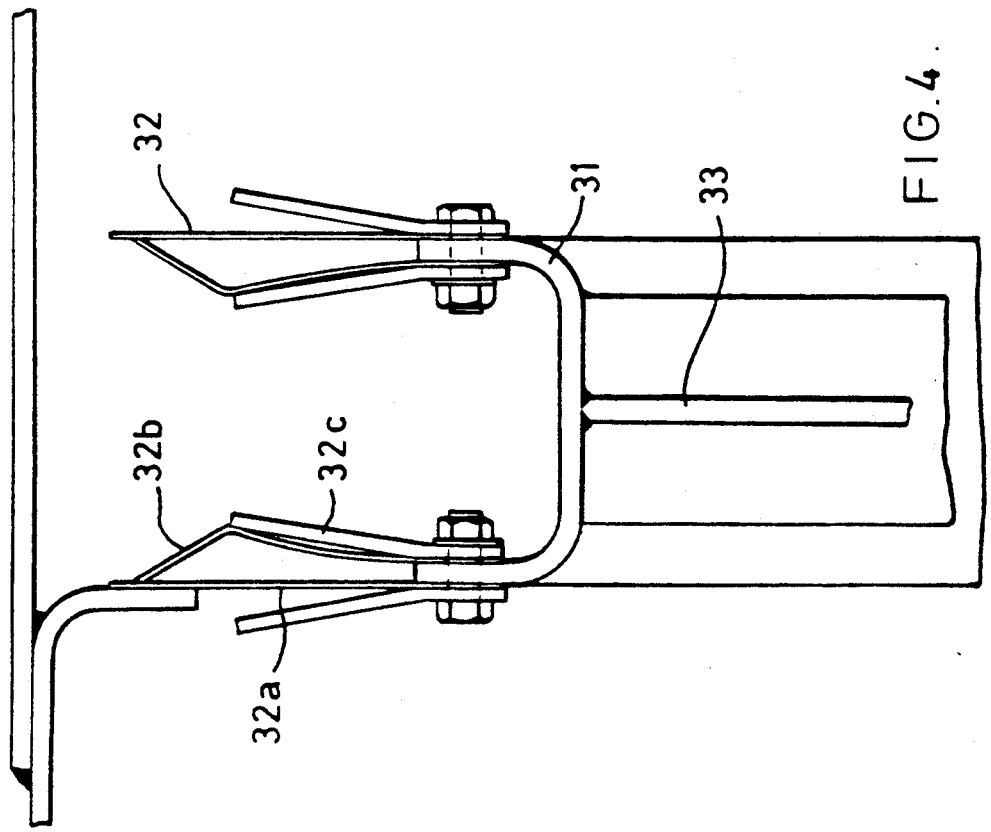
FIG. 4 is a side view of a part of a blade structure wherein no blade insulation is employed.

In addition, the blade plate 25 has a dished construction (26-28) to withstand thermally induced strains due to temperature differences existing between the blade frame and the blade plate. The dished form of the blade plate renders it less rigid and allows it to accommodate these strains by bending of the spigot 27 radially rather than by direct tension of the blade plate and compression of the blade frame. The blade plate is attached to the blade frame, e.g. by being suitably welded into a rectangular channel frame forming the periphery of the blade, e.g. a frame members 22, 23. FIG. 4 shows a part of a blade structure wherein no blade insulation is employed, and is intended to be used in combination with the main feature Of the isolator shown in FIGS. 2 and 3 namely that side members of a blade frame are extended to attach to an operating shaft to act as load bearing members of a flap system (combined blade and flap arm assembly). Specifically, FIG. 4 shows a channel-shaped blade frame 31 sealed by means of a pair of seals 32 (each consisting of a leaf spring 32a together with a bias spring 32b supported by a loading bar 32c) of known design. Since no insulation is required in this embodiment, a blade plate 33 can be welded into the blade frame as no significant temperature differential exists between the blade frame and the blade plate.

In the embodiments of FIGS. 5 and 8 and of FIGS. 6 and 9, respectively, insulation is required for the blade plate. In each of these embodiments a channel-shaped blade frame 31 is sealed by at least a pair of seals 32 as before. In these alternative arrangements, the means for attaching the blade plate 33 to the blade frame 31 is constituted by two flat strips 34a, 34b extending around and welded to the inside of the frame, both strips 34a, 34b being drilled to enable the blade plate 33 to be bolted to them. The outer strip 34a is welded to the frame after bolting the blade in place. The holes in the blade plate are sufficiently large to take up the anticipated amount of differential expansion. The blade plate is attached to the blade frame using bolt assemblies 36 comprising bolts, nuts, flat washers, as shown. On assembly the bolts are fully tightened, then slackened off a predetermined amount to ensure that the blade plate can differentially expand with respect to the blade frame, the nuts being finally tacked to the bolt to prevent slackening. Insulation 37 is provided between the blade plate 33 and cladding 35. The cladding 35 is maintained in place by bolts 38 passing through the insulation 37 as shown in FIGS. 5 and 6.

In the embodiment of FIGS. 5 and 8 a single seal 32 is provided at each side of the blade plate 33, while in the embodiment of FIGS. 6 and 9 a single seal is provided at one side of the blade and a double seal is provided at the other side of the blade;

In both these embodiments the insulation 37 can be on one side of the blade 33 only, because the amount of differential expansion which can be accommodated is not limited by the maximum induced thermal stress, and it is therefore not necessary to minimise the temperature difference between the two components.

In FIGS. 8 and 9, only a single strip 34 is shown instead of the two strips 34a, 34b, and the studs 38 are omitted for reasons of clarity.

In the embodiment of FIG. 7 double seals are provided at both sides of the blade, and like reference numerals indicate like parts as shown in FIGS. 5 and 6. However, in the embodiment of FIG. 7, the cladding 35 (of the embodiments in FIGS. 5 and 6) is replaced by a second blade plate 33b, and furthermore the flexible connection achieved by means of the strips 34 and bolt assemblies 36 (of the embodiments of FIGS. 5 and 6) is instead achieved by the arrangement shown. That is, a two-strip means for attaching the blade plates to the blade frame is used, of which a first strip 41 is welded as shown to both blade plates 33a and 33b, and a second, flexible, strip 42 is welded as shown at one side of the insulation 37 to the blade frame 31 and at the other side of the insulation to the strip 41.

In FIGS. 6 and 7, reference numeral 39 indicates a sealing air inlet, and numeral 40 indicates spacer pillars.

The embodiments of FIGS. 10a, 10b and 10c each show arrangements comprising a channel-shaped blade frame 31, a blade plate 33, and insulation 37 provided between the blade plate 33 and cladding 35. The cladding will be suitably retained in place by bolts (not shown) equivalent to the bolts 38 shown in FIGS. 5 to 7 or by studs (also not shown) similar to the studs 30a shown in FIG. 3.

It is envisaged that each of the embodiments of FIGS. 10a, 10b and 10c will have at each side of the blade plate 33 a single seal (not shown) equivalent to the seals 32 as shown in the embodiment of FIGS. 5 and 8.

Furthermore, in each of the embodiments of FIGS. 10a, 10b and 10c, a flexible connection between the blade plate 33 and the blade frame 31 is achieved by welding of a strip element in a manner similar to the embodiment of FIG. 7, as shown.

In all cases the sizes and thicknesses of the various members may vary according to unit size, loading conditions and material selection.

We claim:
1. An isolator, comprising:
an operating shaft;
a blade including a blade plate, a blade frame supporting said blade plate, and means for attaching said blade plate to said blade frame;
said blade frame having two opposed, cross-sectionally generally channel-shaped, first side members oriented transverse to said shaft and two opposed, cross-sectionally generally channel-shaped, second side members oriented parallel to said shaft, said first side members at corresponding first end regions thereof being extended for attachment to said shaft for transmitting loading of said blade to said shaft, and said second side members being interconnected between said first side members, one at said first end regions of the latter and the other at corresponding second end regions of said first side members;
insulation provided at one side only of said blade plate; and
at least one strip welded to said blade frame and constituting said means for attaching said blade plate to said blade frame, said blade plate being welded to said at least one strip.

2. An isolator, comprising:
an operating shaft;
a blade including a blade plate, a blade frame supporting said blade plate, and means for attaching said blade plate to said blade frame;
said blade frame having two opposed, cross-sectionally generally channel-shaped, first side members oriented transverse to said shaft and two opposed, cross-sectionally generally channel-shaped, second side members oriented parallel to said shaft, said first side members at corresponding first end regions thereof being extended for attachment to said shaft for transmitting loading of said blade to said shaft, and said second side members being interconnected between said first side members, one at said first end regions of the latter and the other at corresponding second end regions of said first side members;
insulation provided at one side only of said blade plate; and
at least one flat strip secured to and extending around the inside boundary of said blade frame and constituting said means for attaching said blade plate to said blade frame, said blade plate being bolted to said at least one flat strip.

3. An isolator as claimed in claim 1 or 2, further comprising a cladding overlying said insulation at the side of the latter remote from said blade plate, said insulating being retained between said blade plate and said cladding.

4. An isolator as claimed in claim 3, further comprising a respective seal provided at each side of said blade frame.

5. An isolator as claimed in claim 1 or 2, further comprising a second blade plate overlying said insulation at the side of the latter remote from the first-mentioned blade plate, said insulation being retained between said blade plates.

6. An isolator as claimed in claim 5, further comprising a respective seal provided at each side of said blade frame.

7. An isolator as claimed in claim 1 or 2, further comprising a respective seal provided at each side of said blade frame.

* * * * *